US008612844B1

(12) United States Patent
Melton et al.

(10) Patent No.: US 8,612,844 B1
(45) Date of Patent: Dec. 17, 2013

(54) SNIFFING HYPERTEXT CONTENT TO DETERMINE TYPE

(75) Inventors: Donald Dale Melton, San Carlos, CA (US); Darin Benjamin Adler, Los Gatos, CA (US); Christopher Blumenberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 1630 days.

(21) Appl. No.: 11/222,661

(22) Filed: Sep. 9, 2005

(51) Int. Cl.
*G06F 17/00* (2006.01)

(52) U.S. Cl.
USPC .......................................................... 715/200

(58) Field of Classification Search
USPC .......................................................... 715/200
See application file for complete search history.

(56) References Cited

U.S. PATENT DOCUMENTS

| | | | |
|---|---|---|---|
| 5,864,870 A * | 1/1999 | Guck | 1/1 |
| 5,991,714 A * | 11/1999 | Shaner | 704/9 |
| 6,243,713 B1 * | 6/2001 | Nelson et al. | 1/1 |
| 6,269,403 B1 * | 7/2001 | Anders | 709/231 |
| 6,573,907 B1 * | 6/2003 | Madrane | 715/719 |
| 6,754,702 B1 * | 6/2004 | Kennelly et al. | 709/223 |
| 6,795,848 B1 * | 9/2004 | Border et al. | 709/213 |
| 7,391,885 B2 * | 6/2008 | Harrington et al. | 382/112 |
| 7,409,405 B1 * | 8/2008 | Masinter et al. | 1/1 |
| 7,421,587 B2 * | 9/2008 | Cowie et al. | 713/188 |
| 7,430,528 B2 * | 9/2008 | Perkowski | 705/27 |
| 7,721,294 B2 * | 5/2010 | Quinet et al. | 719/315 |
| 7,752,258 B2 * | 7/2010 | Lewin et al. | 709/203 |
| 2001/0044855 A1 * | 11/2001 | Vermeire et al. | 709/310 |
| 2002/0108115 A1 | 8/2002 | Palmer | |
| 2002/0126142 A1 * | 9/2002 | Hodgkinson | 345/719 |
| 2002/0152051 A1 * | 10/2002 | Fukushige et al. | 702/179 |
| 2003/0093572 A1 * | 5/2003 | Laux et al. | 709/250 |
| 2003/0101086 A1 * | 5/2003 | San Miguel | 705/9 |
| 2003/0131073 A1 * | 7/2003 | Lucovsky et al. | 709/219 |
| 2003/0177200 A1 * | 9/2003 | Laughlin et al. | 709/218 |
| 2003/0195923 A1 * | 10/2003 | Bloch et al. | 709/203 |
| 2003/0200061 A1 * | 10/2003 | Yamanaka et al. | 702/188 |
| 2004/0088351 A1 * | 5/2004 | Liu et al. | 709/203 |
| 2004/0205149 A1 * | 10/2004 | Dillon et al. | 709/217 |
| 2004/0255005 A1 * | 12/2004 | Spooner | 709/218 |
| 2005/0027750 A1 * | 2/2005 | Martin et al. | 707/200 |

(Continued)

OTHER PUBLICATIONS

Title: Conent Based File Type Detection Algorithm, Author: McDaniel et al., Date: 2003, URL:<http://www.hicss.hawaii.edu/HICSS36/HICSSpapers/STFMS04.pdf>.*

(Continued)

*Primary Examiner* — Laurie Ries
*Assistant Examiner* — Mustafa Amin
(74) *Attorney, Agent, or Firm* — Blakely, Sokoloff, Taylor & Zafman LLP

(57) ABSTRACT

Correct detection of embedded content type enables an operating system to launch the correct program to handle the embedded content. A page retrieval module retrieves an HTML page from a server, the contents of which are parsed by a parsing module. An embedded content analyzer gathers information from the parsed page about content embedded within the web page and proceeds to determine the type of content that is embedded. Content type is determined by analyzing various parameters such as a type specified by the web page, content type provided by an HTTP response, known file extensions present in a URL associated with the content or with the name of the file itself, and by sniffing the file. In one embodiment, the results of each analysis are weighted and a determination is made based upon the weighted total of results.

22 Claims, 5 Drawing Sheets

(56) References Cited

U.S. PATENT DOCUMENTS

| | | | |
|---|---|---|---|
| 2005/0044242 A1* | 2/2005 | Stevens et al. | 709/228 |
| 2005/0114288 A1* | 5/2005 | Dettinger et al. | 707/1 |
| 2005/0166136 A1* | 7/2005 | Capps et al. | 715/500.1 |
| 2005/0193324 A1* | 9/2005 | Purple | 715/510 |
| 2005/0273708 A1* | 12/2005 | Motyka et al. | 715/515 |
| 2005/0273849 A1* | 12/2005 | Araujo et al. | 726/12 |
| 2006/0015630 A1* | 1/2006 | Stolfo et al. | 709/230 |
| 2006/0184639 A1* | 8/2006 | Chua et al. | 709/217 |
| 2006/0190988 A1* | 8/2006 | Adams et al. | 726/2 |
| 2006/0195687 A1* | 8/2006 | Klein et al. | 713/150 |
| 2008/0072305 A1* | 3/2008 | Casado et al. | 726/11 |
| 2009/0063908 A1* | 3/2009 | Sankaran et al. | 714/48 |

OTHER PUBLICATIONS

Tile: MIME typing, Date: Feb. 1, 2002, URL:<http://library.gnome.org/devel/gnome-vfs-2.0/2.20/gnome-vfs-20-gnome-vfs-mime.html>.*

Title: Jave MIME Magic Libarary, Date retrieved: Jul. 14, 2010, URL:<http://sourceforge.net/projects/jmimemagic/files/>.*

Title: Detecting the MIM Type for a file, Date: 2003, URL:<http://people.gnome.org/~shaunm/admin-guide/mimetypes-10.html>.*

Mehi et al., "A new Approach to Content-based File Type Detection", 2008, URL:<http://ieeexplore.ieee.org/stamp/stamp.jsp?arnumber=04625611>.*

Supart et al., "File Type Classification for Adative Object System", 2006, URL:<http://ieeexplore.ieee.org/stamp/stamp.jsp?arnumber=04142399>.*

Wei-Jen et al., "Identifying File Types by n-gram Analysis", Jun. 2005, URL:<http://ieeexplore.ieee.org/xpls/abs_all.jsp?arnumber=1495935>.*

Dunham et al., "Classifying File Type of Stream Ciphers in Depth Using Neural Networks", 2005, URL:<http://ieeexplore.ieee.org/stamp/stamp.jsp?tp=&arnumber=1387088&userType=inst>.*

Archive of Gregorio, J., "How to Use Mime-Types to Get Your Aggregator to Subscribe to an Atom Feed," BitWorking, Dec. 6, 2003, [online] [Archived by http://archive.org on Dec. 28, 2003; Retrieved on Aug. 6, 2008] Retrieved from the Internet <URL: http://web.archive.org/web/20031228070846/http://bitworking.org/news/Atom_Auto_Sub_How_To>.

Zimmermann, B., "Atom MIME Type Woes", Feb. 7, 2004, [online] [Retrieved on Aug. 6, 2008] Retrieved from the Internet <URL: http://bernzilla.com/item.php?id=136>.

Archive of Pilgrim, M., "XML.com: What is RSS?", Dec. 18, 2002 [online] [Archived by http://archive.org on Jan. 1, 2003; Retrieved on Aug. 6, 2008] Retrieved from the Internet: <URL: http://web.archive.org/web/20030101130344/http://www.xml.com/pub/a/2002/12/18/dive-into-xml.html>.

Apache, "Apache HTTP Server Version 2.0: Apache Module mod_mime_magic" [online] [Retrieved on Apr. 5, 2005] Retrieved from the internet <URL: http://apache2docs.paradoxical.co.uk/mod/mod_mime_magic.html>.

Mac OS X 10.3, "HMUG-Mac OS X/Darwin man pp. file," Oct. 25, 2003, [online] [Retrieved on Apr. 5, 2005] Retrieved from the internet <URL:http://www.hmug.org/man/1/file.html>.

Microsoft, "Appendix A: MIME Type Detection in Internet Explorer," 2004, [online] [Retrieved on Dec. 6, 2004] Retrieved from the internet <URL: http://msdn.microsoft.com/workshop/networking/moniker/overview/appendix_a.asp>.

Andersen, S., et al., "Changes to Functionality in Microsoft Windows XP Service Pack 2, Part 5: Enhanced Browsing Security," Sep. 15, 2004, [online] [Retrieved on Mar. 6, 2006], Retrieved from the Internet: <URL: http://www.microsoft.com/technet/prodtechnol/winxppro/maintain/sp2brows.mspx?pf=true>.

Biesinger, C., "How Mozilla Determines MIME Types," Mar. 7, 2005 [online] [Retrieved on Feb. 2, 2007] Retrieved from the Internet <URL: http://developer.mozilla.org/en/docs/How_Mozilla_determines_MIME_Types>.

Burton, K., "Apple is Patenting RSS," Mar. 7, 2006, [online] [Retrieved on Apr. 22, 2008] Retrieved from the internet <URL: http://feedblog.org/2006/03/07/apple-is-patenting-rss/>.

Burton, K., "Jakarta FeedParser Cometh," Jan. 30, 2005, [online] [Retrieved on Apr. 22, 2008] Retrieved from the internet <URL: http://www.imc.org/atom-syntax/mail-archive/msg12773.html>.

Burton, K., "Microsoft's RSS Patent Theft," Dec. 23, 2006, [online] [Retrieved on Apr. 22, 2008] Retrieved from the internet <URL: http://feedblog.org/2006/12/23/microsofts-rss-patent-theft/>.

Final Office Action, U.S. Appl. No. 11/371,311, Apr. 30, 2008, 18 Pages.

Gupta, V., "Internet Explorer Content-Type Logic," Feb. 1, 2005, [online] [Retrieved on Mar. 6, 2006], Retrieved from the Internet <URL: http://blogs.msdn.com/ie/archive/2005/02/01/364581.aspx>.

Hachamovitz, D., "Longhorn loves RSS!", Jun. 24, 2005, [online] [Retrieved on Apr. 22, 2008] Retrieved from the internet <URL: http://blogs.msdn.com/ie/archive/2005/06/24/432390.aspx>.

Archive of Jurdzik, G., "Firefox Help—Tutorials: Bookmarks (The Mozilla Help Site)," [online] [Archived by http://archive.org on Mar. 12, 2005; Retrieved on Feb. 5, 2007] Retrieved from the Internet <URL: http://web.archive.org/web/20050312075109/http://mozilla.gunnars.net/firefox_bookmarks_tutorial.html>.

Kennedy, N., "In-depth analysis of Microsoft content syndication platform patent application," Dec. 22, 2006, [online] [Retrieved on Apr. 22, 2008] Retrieved from the internet <URL: http://www.niallkennedy.com/blog/2006/12/microsoft-feed-platform-patent-review.html>.

Archive of Microsoft Corp., "Appendix A: MIME Type Detection in Internet Explorer," Nov. 5, 2004, [online] [Archived by http://archive.org on Nov. 5, 2004; Retrieved on Mar. 6, 2006], Retrieved from the Internet: <URL : http://web.archive.org/web/20041105055442/http://msdn.microsoft.com/workshop/networking/moniker/overview/appendix_a.asp>.

Microsoft Corp., "MIME Type Detection in Internet Explorer," 2007, [online] [Retrieved on Feb. 2, 2007] Retrieved from the Internet <URL: http://msdn.microsoft.com/workshop/networking/moniker/overview/...>.

Microsoft Team RSS Blog, "Windows RSS Publisher's Guide (work-in-progress)," Aug. 11, 2006, [online] [Retrieved on Jan. 31, 2007] Retrieved from the Internet <URL: http://blogs.msdn.com/rssteam/articles/PublishersGuide.aspx>.

Newsmonster, "The cross-platform weblog manager with a brain!" Jul. 29, 2003, [online] [Retrieved on Apr. 22, 2008] Retrieved from the internet <URL: http://www.newsmonster.info/news.shtml>.

Non-Final Office Action, U.S. Appl. No. 11/371,311, Aug. 16, 2007, 18 Pages.

Pilgrim, M., "Important Change to the LINK Tag," Jun. 2, 2002, [online] [Retrieved Jan. 31, 2007] Retrieved from the Internet <URL: http://diveintomark.org/archives/2002/06/02/important_change_to_the_link_tag>.

Archive of Pilgrim, M., "RSS auto-discovery in Python," May 31, 2002, [online] [Archived by http://archive.org on Oct. 17, 2002; Retrieved on Apr. 22, 2008] Retrieved from the internet <URL: http://web.archive.org/web/20021017051613/diveintomark.org/archives/2002/05/31.html>.

Archive of Pilgrim, M., "Ultra-liberal RSS locator," Aug. 15, 2002, [online] [Archived by http://archive.org on Aug. 16, 2002; Retrieved on Apr. 22, 2008] Retrieved from the internet <URL: http://web.archive.org/web/20020816234309/diveintomark.org/archives/2002/08/15.html>.

Reinacker, G., "RSS and MIME types," Sep. 21, 2003, [online] [Retrieved on Jan. 8, 2007] Retrieved from the internet <URL: http://www.rassoc.com/gregr/weblog/archive.aspx?post=662>.

RSS Advisory Board, "RSS Autodiscovery," Nov. 27, 2006, [online] [Retrieved on Jan. 31, 2007] Retrieved from the Internet <URL: http://www.rssboard.org/rss-autodiscovery>.

Archive of Bradbury, N., "FeedDemon and the feed://protocol," Jun. 11, 2004, 13 pages, [online] [archived by http://archive.org on Dec.

(56) References Cited

OTHER PUBLICATIONS 11, 2004] [retrieved on Sep. 23, 2010] Retrieved from the internet <URL: http://web.archive.org/web/20041211210957/http://nick.typepad.com/blog/2004/06/feeddemon_and_t.html>.

Reinacker, G., "Subscriptions with feed://," Greg Reinacker's Weblog, Sep. 15, 2003, 13 pages, [online] [retrieved on Sep. 10, 2010] Retrieved from the internet <URL: http://www.rassoc.com/gregr/weblog/2003/09/15/subscriptions-with-feed/>.

Microsoft Corporation, "Handling MIME Types in Internet Explorer," 2010, 3 pages, [online] [retrieved on Sep. 10, 2010] Retrieved from the internet <URL: http://msdn.microsoft.com/en-us/library/ms775148(VS.85,printer).aspx>.

\* cited by examiner

300

```
<p>Visit the Apple Store <a href="/store/"><strong>online</strong></a> or at <a href="/retail/"><strong>retail</strong></a> locations.<br>1-800-MY-APPLE</p>
<OBJECT CLASSID="clsid:02BF25D5-8C17-4B23-BC80-D3488ABDDC6B"
WIDTH="160" HEIGHT="144"
CODEBASE="http://www.apple.com/qtactivex/qtplugin.cab">
<PARAM name="SRC" VALUE="sample.mov">
<PARAM name="AUTOPLAY" VALUE="true">
<PARAM name="CONTROLLER" VALUE="false">
<EMBED SRC="sample.mov" TYPE="video/quicktime"
WIDTH="160" HEIGHT="144"
AUTOPLAY="true" CONTROLLER="false"
PLUGINSPAGE="http://www.apple.com/quicktime/download/">
</EMBED>
</OBJECT>
<p>Find <a href="/jobs/"><strong>Job Opportunities</strong></a> at Apple.</p>
```

SNIFFING HYPERTEXT CONTENT TO DETERMINE TYPE

BACKGROUND OF THE INVENTION

1. Field of the Invention

The present invention relates generally to identifying content provided over a network. In particular, the present invention is directed toward determining a type of content embedded within a page of the Word Wide Web.

2. Description of the Related Art

Content viewed over the World Wide Web often involves more than simply plain text. Today's web surfers are able to listen to music, view movies and perform various animation tasks, bank online, and play games. In some instances, surfers view this content by following a link directly to the content. Perhaps more commonly, the content is embedded within a web page provided by a web server to a web client, and referenced using HTML tags. These embedding tags, such as the <embed> and <object> tags, inform the web client about the type of content that is embedded. This typically signals the web client to use a particular plug-in application in order to display the content. In the case of an <embed> tag, the content type is specified by use of a MIME type, which is typically associated at the client side with a particular application that handles that type of content. In the case of an <object> tag, a class ID is typically also provided. The class ID typically uniquely identifies a particular version of a particular application that should be used to play the object.

Because the plug-in application is chosen according to the tag, it is possible that the plug-in specified will not be the plug-in most appropriate for the content to be viewed. This might happen, for example, due to programmer error, content revisions that are not correctly propagated to all documents, etc. Under these circumstances, the content is not viewable, and typically the end user is provided with an error message, or undecipherable characters.

Conventional methods exist for determining the content type of a web page returned by the server. For example, in Microsoft's Internet Explorer, MIME type determination occurs through a FindMimeFromData method that contains hard-coded tests for a variety of MIME types. The method scans through the buffer contents and identifies a MIME type that is either known, unknown or ambiguous. Although the method can be used for determining the content type of a whole page, it does not address the problem of identifying the type of content embedded within a page.

Accordingly, there is a need for a system and method for more reliably identifying types of content received over the World Wide Web.

SUMMARY OF THE INVENTION

The present invention enables correct detection of embedded content type, which in turn enables an operating system to launch the correct program to handle the embedded content. A page retrieval module of the present invention retrieves an HTML page from a server, the contents of which are parsed by a parsing module. An embedded content analyzer gathers information from the parsed page about content embedded within the web page and proceeds to determine the type of content that is embedded. Content type is determined by analyzing various parameters such as a type specified by the web page, content type provided by an HTTP response, known file extensions present in a URL associated with the content or with the name of the file itself, and by sniffing the file. In one embodiment, the results of each analysis are weighted and a determination is made based upon the weighted total of results.

BRIEF DESCRIPTION OF THE DRAWINGS

FIG. 3 illustrates an example of HTML code for specifying embedded content parameters.

The figures depict preferred embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
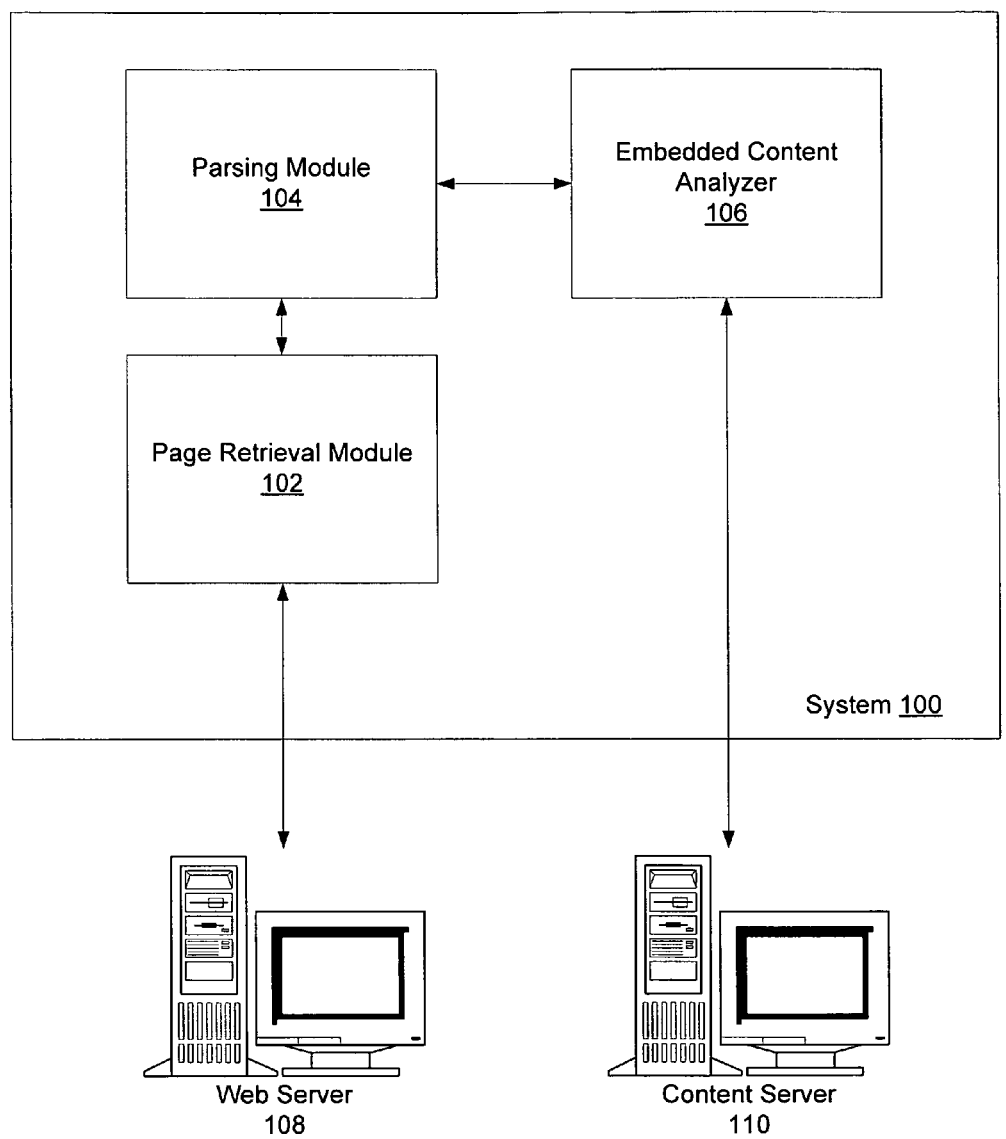
FIG. 1 is a block diagram illustrating a system for embedded content-type detection in accordance with an embodiment of the present invention.

FIG. 1 illustrates a system 100 for performing embedded content type detection in accordance with an embodiment of the present invention. System 100 includes a page retrieval module 102 for retrieving web pages from a web server 108. A parsing module 104 parses pages retrieved by page retrieval module 102, and passes any embedded content information in the page to an embedded content analyzer 106. The embedded content analyzer 106 retrieves embedded content from a content server 110 and determines its proper content type in the mariner described below. Note that the system illustrated in FIG. 1 is merely one possible embodiment of system 100, and other embodiments of such a system can provide similar functionality—for example, all three modules 102, 104, 106 may be sub-modules of a single web browser, or may be subdivided further into more granular components.

Figure 2:
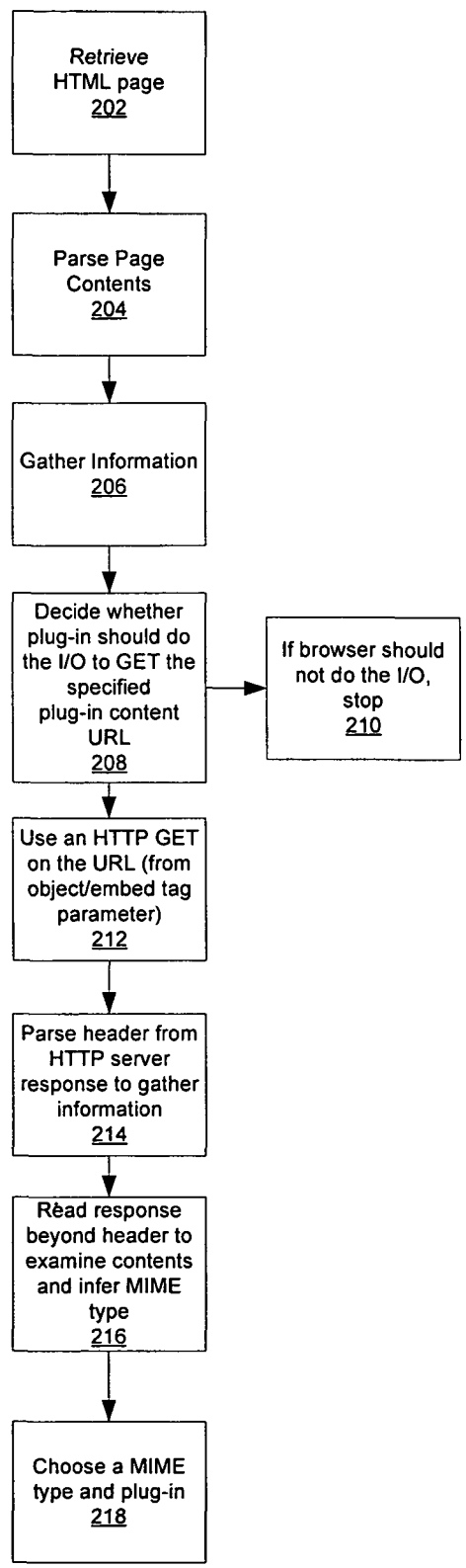
FIG. 2 is a flowchart illustrating a method for determining embedded content type detection in accordance with an embodiment of the present invention.

Referring now to FIG. 2, there is shown a method for determining a content type in accordance with a preferred embodiment of the present invention. First, at step 202, page retrieval module 102 retrieves an HTML page from a web server 108 using a conventional HTTP GET request. The contents of the retrieved page are then parsed 204 by parsing module 104. An example of code 300 to be parsed is illustrated in FIG. 3. A portion 302 of the code contains an <object> tag and associated fields.

In the example of code 302, the "classID" attribute identifies a particular ActiveX control for use when viewing the content on a computer running the Microsoft Windows operating system. The "width" and "height" attributes specify a size of the page that should be allocated to present the embedded content. The "codebase" attribute specifies a URL where the appropriate ActiveX control can be downloaded. The tags and attributes included in code 300 are but one example of HTML describing embedded content. Those of skill in the art are familiar with a variety of tags and parameters that are available to those providing embedded content within a web page.

Embedded content analyzer 106 of system 100 then gathers 206 information from the parsed page about its embedded content. The information available is preferably HTML-compliant and typically includes a class ID (if the <object> type is used), a specified MIME type (which may or may not be accurate), a codebase and plug-ins page, and a URL of the actual embedded content data.

Next, embedded content analyzer 106 determines 208 whether the embedded content should be retrieved by the specified plug-in or by the browser. If 210 the specified plug-in is responsible for obtaining the content, then the process terminates. This may be the case, for example, if a class ID is present in the code and the particular class ID is known with certainty to the browser to correspond to a particular plug in. If the browser is to retrieve the embedded content, then it sends 212 an HTTP GET request to the content server 110 identified by the URL specified in the page by the "src" parameter. Parsing module 104 then parses 214 the HTTP response received from the content server 110 to obtain the values specified by the content-type and content-disposition fields of the HTTP response. An example of an HTTP response that is returned in one embodiment where the content is a QuickTime movie is:

HTTP/1.1 200 OK
Content-Length: 32483
Content-Type: video/quicktime
Server: Apache/1.3.29 (Darwin) PHP/4.3.1
Last-Modified: Thu, 31 Mar. 2005 23:08:23 GMT
ETag: "7ee3-424c82e7"
Cache-Control: max-age=2406
Expires: Wed, 6 Apr. 2005 19:24:53 GMT
Date: Wed, 6 Apr. 2005 18:44:47 GMT
Connection: keep-alive The response header in this example would then be followed by 32483 bytes of movie data in QuickTime format. Embedded content analyzer 106 examines 216 the HTTP response received from content server 110, reading past the header data and examining the content of the file. In a preferred embodiment, embedded content analyzer 106 sniffs (i.e. reads) a small amount, e.g., 4 kilobytes, of the content to determine its type. Embedded content analyzer 106 then draws an inference based on the sniffed data as to the correct MIME-type. In one embodiment, embedded content analyzer 106 uses a conventionally-known Unix magic number algorithm to identify a file's type by determining whether the file includes a certain magic number. A magic file (typically /usr/share/magic in Unix) specifies which magic numbers should be tested for, and how to do the test. Magic tables are currently used in the art to interpret, for example, Unix-style command line instructions and determine file types relevant to those instructions. An embodiment of the present invention uses the logic of magic table entries to determine content type. Magic numbers are further described in the Unix "man" page for "magic". In one embodiment, the magic number algorithm also reports a confidence value indicating how close the tested content is to the canonical result for the determined file type. For example, each magic number rule has an associated weight number. The algorithm then returns a cumulative number indicating the total weight of all the rules that match the content.

System 100 next combines the results of the tests described above in order to make 218 a determination as to the correct content-type for the embedded content. For example, in one embodiment if sniffing the content of a file indicates that the file is a text file, embedded content analyzer 106 assigns a value of +5 to a text weight. If the result of magic number analysis suggests that the file is an mp3 file, embedded content analyzer 106 assigns a value of +10 to an mp3 weight. In this example, the result of sniffing and of magic number analysis differ, but the magic number analysis has a greater weight, so embedded content analyzer 106 determines that the file is an mp3 file. As will be apparent to those of skill in the art, the weight assigned to a result determined by each type of analysis can be varied to tweak results.

In one embodiment, the choice 218 of a MIME type by system 100 depends on a combination of factors including actual gathered information about the content; inferred information about the content (as described above with respect to sniffing of the data); a mapping from class ID, file name extensions and codebases to plug-ins; and a mapping from a specified plug-in page to a plug-in.

Figure 4:
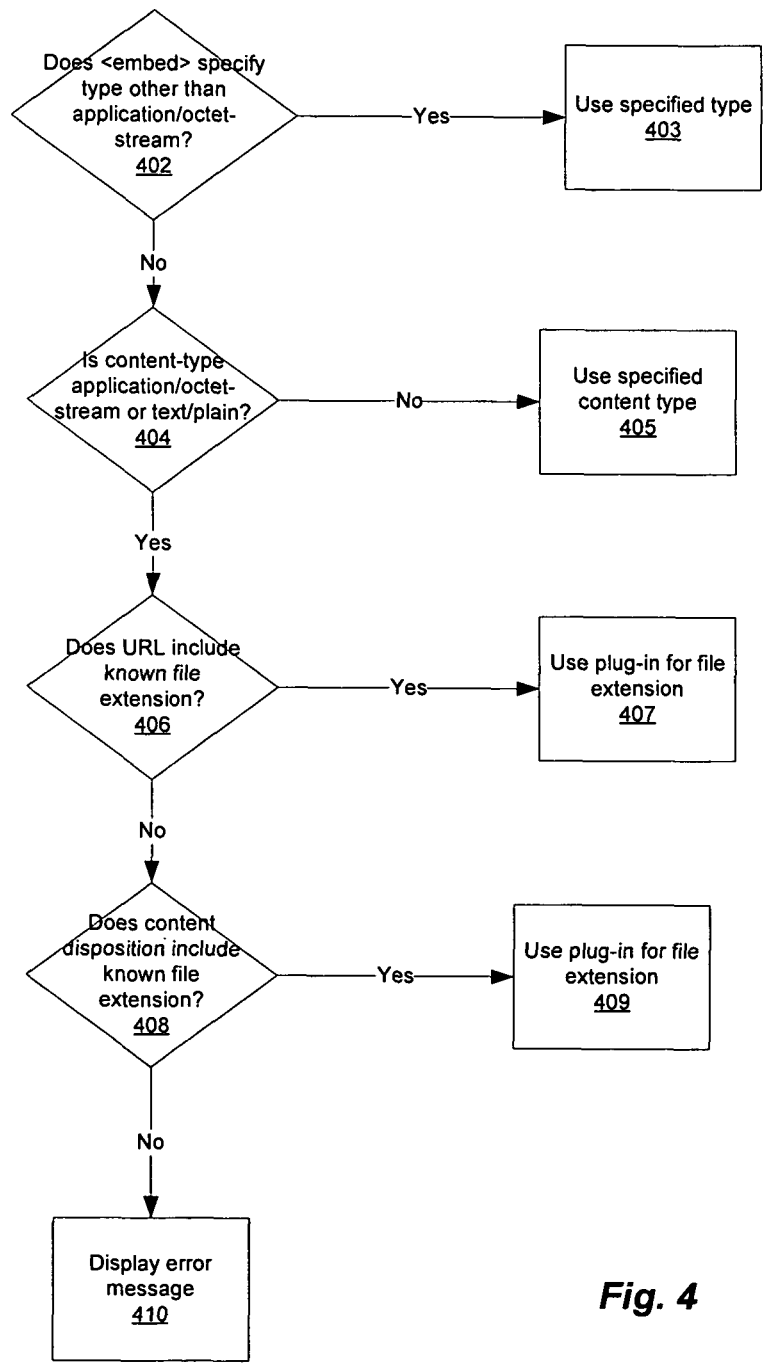
FIG. 4 is a flow chart illustrating a method for selecting a correct content type for retrieved embedded content in accordance with an embodiment of the present invention.

FIG. 4 is a flowchart illustrating a method for determining a content type in accordance with an embodiment of the present invention. First, if a type is 402 specified in an <embed> tag, and the type is other than "application/octet-stream", embedded content analyzer 106 uses 403 that type as the content type. The "application/octet-stream" tag is typically ignored because it provides essentially no information about the content type of the file. Next, if no type is included in an <embed> tag, or if the type is "application/octet-stream", embedded content analyzer 106 checks 404 the type listed in the "content type" supplied as part of the HTTP response, and uses 405 that type unless the indicated content type is "application/octet-stream" or "text/plain". The "text/plain" type is preferably ignored like the "application/octet-stream" tag, because it is frequently used incorrectly and thus should not be relied upon. If a type has still not been selected, embedded content analyzer 106 then determines 406 whether the URL specifying the location of the embedded content includes a file extension stored in a database of system 100. If so, then embedded content analyzer 106 uses 407 the plug-in associated with the file extension. If not, it examines the content disposition header to determine whether 408 it includes a file extension stored in a database of system 100. If so, then embedded content analyzer 106 uses 409 the plug-in associated with the file extension. Finally, if a content type has not been determined by the above steps, an error message is displayed 410 indicating that the content cannot be displayed.

In one embodiment, the method just described is altered to assign a score to each outcome. For example, if in step 404 the content-type is "text/plain" a score of +1 might be assigned to "text/plain" as a potential content type. At step 406, if the URL includes a known file extension for an mp3, a score of +3 might be assigned to "audio/mpeg3" as a potential content type. Embedded content analyzer 106 then assigns the content type having the highest score as the content type to be used for the file.

Figure 5:
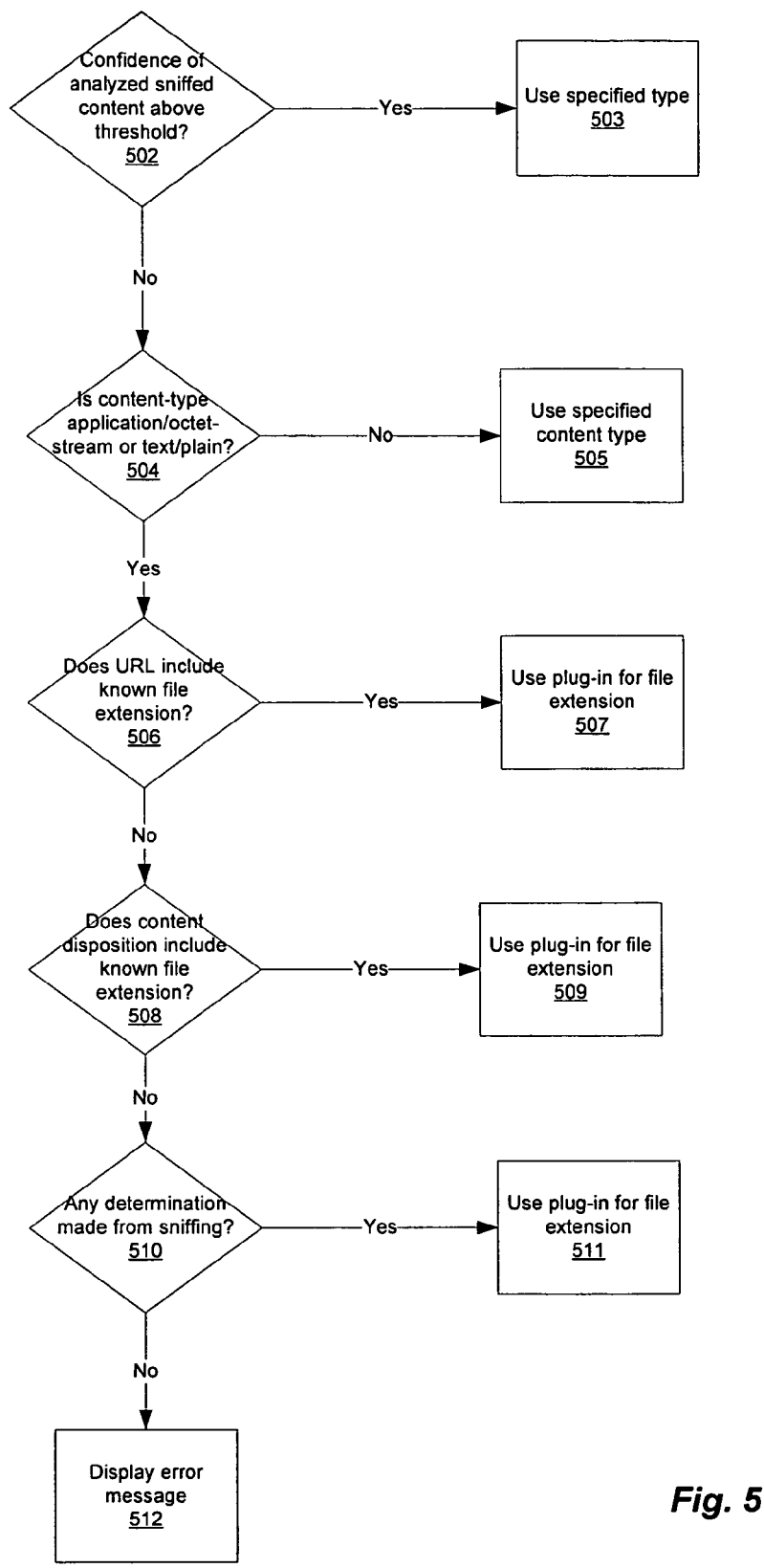
FIG. 5 is a flow chart illustrating a method for selecting a correct content type for retrieved embedded content in accordance with an embodiment of the present invention.

FIG. 5 is a flowchart illustrating a method for determining a content type in accordance with an alternative embodiment of the present invention. First, if 502 the result of sniffing by the embedded content analyzer 106 returned a content type with a level of confidence greater than a threshold amount, that type is used 503 by system 100. In the alternative, embedded content analyzer 106 next checks 504 the type listed in the "content type" of the HTTP response, and as described above, uses 505 that type unless the indicated content type is "application/octet-stream" or "text/plain". If a type has still not been selected, embedded content analyzer 106 then determines 506 whether the URL specifying the location of the embedded content includes a file extension stored in a database of system 100. If so, then embedded content analyzer 106 uses 507 the plug-in associated with the file extension. If not, it examines the content disposition header to determine whether 508 it includes a file extension stored in a database of system 100. If so, then embedded content analyzer 106 uses 509 the plug-in associated with the file extension. If not, then embedded content analyzer 106 uses 511 any determination it is able 510 to make based on the sniffing of the content type, regardless of the confidence level. Finally, if a content type has not been determined by the above steps, an error message is displayed 512 indicating that the content cannot be displayed.

Note that as with the method illustrated in FIG. 4, the above method can be modified in one embodiment to assign a score to each outcome.

The present invention has been described in particular detail with respect to a limited number of embodiments. Those of skill in the art will appreciate that the invention may additionally be practiced in other embodiments.

Within this written description, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component. For example, the particular functions of embedded content analyzer 106, page retrieval module 102, parsing module 104 and so forth may be provided in many or one module.

Some portions of the above description present the feature of the present invention in terms of algorithms and symbolic representations of operations on information. These algorithmic descriptions and representations are the means used by those skilled in the art to most effectively convey the substance of their work to others skilled in the art. These operations, while described functionally or logically, are understood to be implemented by computer programs. Furthermore, it has also proven convenient at times, to refer to these arrangements of operations as modules or code devices, without loss of generality.

It should be borne in mind, however, that all of these and similar terms are to be associated with the appropriate physical quantities and are merely convenient labels applied to these quantities. Unless specifically stated otherwise as apparent from the present discussion, it is appreciated that throughout the description, discussions utilizing terms such as "processing" or "computing" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. The process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention.

The invention claimed is:

1. A method for determining a type of embedded content in a web page, the method comprising:

receiving web page content;

parsing the received web page content;

determining from the parsing that the web page content specifies embedded content to be retrieved;

requesting the embedded content; receiving the embedded content and a response header;

analyzing the received embedded content to determine a first type of the embedded content;

analyzing the received response header to determine a second type of the embedded content; and responsive to one of the first type of the embedded content and the second type of the embedded content not being an excluded content type, determining a third type of the embedded content based on the first type of the embedded content and based on the second type of the embedded content, wherein the third type of the embedded content is either the first type of the embedded content or the second type of the embedded content; and responsive to the first type of the embedded content and the second type of the embedded content being excluded content types, determining the third type of the embedded content based on a highest score of a plurality of generated scores for a plurality of possible content types, the plurality of possible content types comprising the second type of the embedded content, the first type of the embedded content, and a content type associated with a file extension for the embedded content.

2. The method of claim 1 wherein analyzing the received embedded content includes sniffing the embedded content.

3. The method of claim 2 further comprising using a magic-number algorithm to determine the first content type from the sniffed embedded content.

4. The method of claim 3 wherein the magic-number algorithm includes a confidence value indicative of the accuracy of the determined first content type.

5. The method of claim 1, further comprising:
for each of the plurality of possible content types, generating the score for each possible content type, each score indicative of a likelihood that the embedded content is of the corresponding possible content type.

6. The method of claim 5 wherein the scores are generated according to results of a plurality of content type analyses.

7. The method of claim 6 wherein one of the plurality of content type analyses includes using a magic-number algorithm.

8. The method of claim 6 wherein one of the plurality of content type analyses includes sniffing the embedded content.

9. The method of claim 6 wherein one of the plurality of content type analyses includes determining a mapping from a class ID attribute to a content type.

10. The method of claim 6 wherein one of the plurality of content type analyses includes determining a mapping from a file name extension to a content type.

11. The method of claim 6 wherein one of the plurality of content type analyses includes determining a mapping from a codebase attribute within an HTML <object> tag to a content type.

12. The method of claim 6 wherein one of the plurality of content type analyses includes determining a mapping from a specified plug-in location to a content type.

13. The method of claim 1, further comprising:
determining from the parsing that the web page content specifies embedded content to be retrieved from an embedded content source, the embedded content source identified by a URL that includes the file extension; and
responsive to determining the third type is the content type associated with the file extension, determining that the embedded content should be handled by a plug-in associated with the file extension based on the file extension being associated with the plug-in in a database.

14. The method of claim 1, wherein the received response header includes a content-disposition field, further comprising:
responsive to the content-disposition field including the file extension and determining that the third type is the content type associated with the predetermined file extension, determining that the embedded content should be handled by a plug-in associated with the file extension based on the file extension being associated with the plug-in in a database.

15. A computer program product for determining a type of embedded content in a web page, the computer program product stored on a non-transitory computer readable medium and including instructions configured to cause a processor to carry out the steps of:
receiving web page content;
parsing the received web page content;
determining from the parsing that the web page content specifies embedded content to be retrieved;
requesting the embedded content;
receiving the embedded content and a response header;
analyzing the received embedded content to determine a first type of the embedded content;
analyzing the received response header to determine a second type of the embedded content; and
responsive to one of the first type of the embedded content and the second type of the embedded content not being an excluded content type, determining a third type of the embedded content based on the first type of the embedded content and based on the second type of the embedded content, wherein the third type of the embedded content is either the first type of the embedded content or the second type of the embedded content; and
responsive to the first type of the embedded content and the second type of the embedded content being excluded content types, determining the third type of the embedded content based on a highest score of a plurality of generated scores for a plurality of possible content types, the plurality of possible content types comprising the second type of the embedded content, the first type of the embedded content, and a content type associated with a file extension for the embedded content.

16. A system for determining a type of embedded content in a web page, the system comprising:
receiving means, for receiving web page content;
parsing means, coupled to the receiving means, for parsing the received web page content;
determining means, coupled to the parsing means, for determining from the parsing that the web page content specifies embedded content to be retrieved;
requesting means, coupled to the determining means, for requesting the embedded content;
receiving means, coupled to the requesting means, for receiving the embedded content and a response header; and
analyzing the received embedded content to determine a first type of the embedded content;
analyzing the received response header to determining a second type of the embedded content; and
responsive to one of the first type of the embedded content and the second type of the embedded content not being an excluded content type, determining a third type of the embedded content based on the first type of the embedded content and based on the second type of the embedded content, wherein the third type of the embedded content is either the first type of the embedded content or the second type of the embedded content; and
responsive to the first type of the embedded content and the second type of the embedded content being excluded content types, determining the third type of the embedded content based on a highest score of a plurality of generated scores for a plurality of possible content types, the plurality of possible content types comprising the second type of the embedded content, the first type of the embedded content, and a content type associated with a file extension for the embedded content.

17. A system for determining a type of embedded content in a web page, the system comprising:
a processor;
a page receiving module executed by the processor for receiving web page content;
a parsing module, coupled to the page receiving module and executed by the processor, for parsing the received web page content; and
an embedded content analyzer, coupled to the parsing module and executed by the processor, for:
determining from the parsing that the web page content specifies embedded content to be retrieved;
requesting the embedded content;
receiving the embedded content and a response header;
analyzing the received embedded content to determine a first type of the embedded content;

analyzing the received response header to determine a second type of the embedded content;

responsive to one of the first type of the embedded content and the second type of the embedded content not being an excluded content type, determining a third type of the embedded content based on the first type of the embedded content and based on the second type of the embedded content, wherein the third type of the embedded content is either the first type of the embedded content or the second type of the embedded content; and responsive to the first type of the embedded content and the second type of the embedded content being excluded content types, determining the third type of the embedded content based on a highest score of a plurality of generated scores for a plurality of possible content types, the plurality of possible content types comprising the second type, the first type, and a content type associated with a file extension for the embedded content.

18. A method for determining a type of embedded content in a web page, the method comprising:

receiving web page content;

parsing the received web page content to identify a reference to embedded content;

requesting the referenced embedded content;

receiving the embedded content and an associated response header, the response header specifying a first content type of the embedded content for the received embedded content;

sniffing the received embedded content to determine a second content type of the embedded content, the determination having an associated level of confidence;

responsive to the level of confidence associated with the determined second content type of the embedded content exceeding a threshold level, displaying tile embedded content on the web page using the second content type of the embedded content;

responsive to the level of confidence associated with the determined second content type of the embedded content not exceeding the threshold level and responsive to the first content type of the embedded content not being an excluded content type, displaying the embedded content on the web page using the first content type of the embedded content; and responsive to the level of confidence associated with the determined second content type of the embedded content not exceeding the threshold level and responsive to the first content type of the embedded content being an excluded content type, displaying the received embedded content using a content type with a highest score of a plurality of generated scores for a plurality of possible content types, the plurality of possible content types comprising the sniffed second content type of the embedded content, the specified first content type of the embedded content and a content type associated with a file extension for the embedded content.

19. The method of claim 18 wherein the embedded content is retrieved from a first location, the method further comprising:

determining whether a URL specifying the first location includes one of a plurality of file extensions indexed to a plug-in in a database.

20. The method of claim 19 further comprising:

responsive to the URL including a file extension not indexed to a plug-in in the database, displaying the received embedded content using the second content type of the embedded content.

21. The method of claim 18, wherein the excluded content type is one of application/octet-stream and text/plain.

22. The method of claim 19 further comprising:

responsive to the URL including one of the plurality of file extensions, displaying the received embedded content using the indexed plug-in.

\* \* \* \* \*